United States Patent
Kanno et al.

[11] Patent Number: 5,877,391
[45] Date of Patent: Mar. 2, 1999

[54] METHOD FOR TREATING GAS CONTAINING ORGANOHALOGEN COMPOUNDS, AND CATALYST FOR DECOMPOSING THE ORGANOHALOGEN COMPOUNDS

[75] Inventors: Shuichi Kanno; Hiroshi Kawagoshi, both of Hitachi; Akira Kato, Mito; Toshiaki Arato, Hitachinaka; Hisao Yamashita; Shigeru Azuhata, both of Hitachi; Shin Tamata, Ooarai-machi; Shinzō Ikeda, Toukai-mura; Takeshi Yasuda, Tokyo, all of Japan

[73] Assignee: Hitachi, Ltd., Tokyo, Japan

[21] Appl. No.: 811,512

[22] Filed: Mar. 4, 1997

[30] Foreign Application Priority Data

Mar. 5, 1996 [JP] Japan .................................. 8-047130
Jan. 22, 1997 [JP] Japan .................................. 9-009175

[51] Int. Cl.[6] .......................... B01D 53/38; A62D 3/00; C01B 7/00
[52] U.S. Cl. ................ 588/205; 423/240 R; 423/240 S; 588/206
[58] Field of Search ..................... 588/206, 205, 588/213; 423/240 R, 240 S, 245.3

[56] References Cited

U.S. PATENT DOCUMENTS

| | | | |
|---|---|---|---|
| 4,221,768 | 9/1980 | Inoue et al. ............................ | 423/239 |
| 5,176,897 | 1/1993 | Lester ...................................... | 423/659 |
| 5,283,041 | 2/1994 | Nguyen et al. ....................... | 423/240 S |
| 5,292,704 | 3/1994 | Lester ...................................... | 502/309 |
| 5,430,230 | 7/1995 | Mitsui et al. ........................... | 588/206 |
| 5,759,504 | 6/1998 | Kanno et al. ......................... | 423/240 S |

FOREIGN PATENT DOCUMENTS

| | | | |
|---|---|---|---|
| 547226 | 6/1993 | European Pat. Off. ........ | B01D 53/36 |
| 1-111443 | 4/1989 | Japan ............................. | B01D 53/36 |

*Primary Examiner*—Gary P. Straub
*Assistant Examiner*—Eileen E. Nave
*Attorney, Agent, or Firm*—Fay, Sharpe, Beall, Fagan, Minich & McKee

[57] ABSTRACT

A method for treating a gas flow containing organohalogen compounds including the steps of contacting the gas flow with a catalyst at a temperature below 500° C. in the presence of an effective amount of steam, wherein the catalyst contains titania, tungsten oxide, and silica, the Ti and W are present in the range of 20–95 mol % Ti and 5–80 mol % W based on Ti and W, and the amount of silica is in the range of 0.5–15% by weight silica to 100% by weight titania. Accordingly, the organohalogen compound can be decomposed effectively to carbon monoxide, carbon dioxide, and hydrogen halide.

10 Claims, 5 Drawing Sheets

METHOD FOR TREATING GAS CONTAINING ORGANOHALOGEN COMPOUNDS, AND CATALYST FOR DECOMPOSING THE ORGANOHALOGEN COMPOUNDS

BACKGROUND OF THE INVENTION

The present invention relates to a method for decomposing organic compounds containing halogen, i.e. fluorine, chlorine, bromine, and the like such as chlorofluorocarbon group (CFC group, for instance flon), trichloroethylene, methyl bromide, halon, and the like, using a catalyst effectively, and to the catalyst for decomposing organic compounds containing halogen, which maintains its activity for a long time.

Organohalogen compounds such as chlorofluorocarbon, trichloroethylene, methyl bromide, halon, and the like, have been widely used as foaming agents, refrigerants, fire extinguishers, fumigating agents, and others. However, it has been pointed out that the organohalogen compounds cause destruction of the ozone layer of the earth, and give serious influences to the environment such as enhanced generation of carcinogenic substances. Therefore, various methods for decomposing treatment of the organohalogen compounds have been investigated.

As for the decomposing treatment method, combustion technology at an elevated temperature, and plasma technology are main stream. However, these methods have a low energy efficiency because they require a large amount of fuel or electricity and cause a problem of generating damages to the reactor wall by generated corrosive halogen gas. Especially, the plasma method has a large loss of energy when content of the organohalogen compounds in the treated gas is low. On the contrary, a decomposing methods using a catalyst is an effective and superior method, which is capable of treating the gas with low energy if the catalyst has a sufficiently high performance.

As for methods using a catalyst for decomposing organohalogen compounds, the methods using a catalyst containing titania ($TiO_2$) and tungsten oxide ($WO_3$) have been disclosed in U.S. Pat. No. 5,292,704 and U.S. Pat. No. 5,176,897. The catalyst disclosed in the above references contains 0.1~20% parts by weights $WO_3$ to 100 parts by weight $TiO_2$ (the amount of titanium is in a range of 92 mol %~99.96 mol %, and tungsten is in a range of 0.04 mol %~8 mol % based on Ti and W). The catalyst maintained a decomposition fraction of 99% at 375° C. for 1500 hours in order to treat $CCl_4$ of ppm order. However, the influence of the organohalogen compounds as catalytic poison is caused by fluorine, rather larger than chlorine. Accordingly, an anti-halogen catalyst, which is scarcely reactive with halogen elements both of chlorine and fluorine, is required.

SUMMARY OF THE INVENTION

The object of the present invention is to provide high performance catalyst for decomposing organohalogen compounds, a catalyst that is capable of suppressing reactions of fluorine and chlorine in the organohalogen compounds, and of maintaining the high performance for a long time, and a method for treating gas containing the organohalogen compounds.

The present invention relates to a method for treating gas flow containing organohalogen compounds by contacting a catalyst, which contains titania and tungsten oxide, at a temperature lower than 500° C. in the presence of an effective amount of steam, wherein the gas flow is contacted with the catalyst containing titania, tungsten oxide, and silica to decompose the organohalogen compounds to carbon monoxide, carbon dioxide, and hydrogen halides. The catalyst contains silica in the range of 0.5~15 parts by weight to 100 parts by weight, titania and the Ti and W are present in the amount of 20 mol %~95 mol % Ti and 80 mol %~5 mol % W based on Ti and W.

The present invention further relates to catalyst comprising titania and tungsten oxide for treating gas flow containing organohalogen compounds, wherein the catalyst for decomposing the organohalogen compounds contains silica in the range of 0.5~15 parts by weight to 100 parts by weight titania, and the Ti and W are present in the amount of 20 mol %~95 mol % Ti and 80 mol %~5 mol % W based on Ti and W.

The inventors achieved the present invention on the basis of a result obtained by investigating in detail a high performance catalyst, which is capable of decomposing organohalogen compounds with a high efficiency, and is scarcely deteriorated by halogen, especially fluorine, in the reactants and the decomposition products. That is the catalyst containing titania, silica, and tungsten oxide, wherein silica is contained in the range of 0.5~15 parts by weight to titania 100 parts by weight, and the Ti and W are present in the amount of 20 mol %~95 mol % Ti and 80 mol %~5 mol % W based on Ti and W. Surface of titania in the catalyst is desirably coated with porous layers made of silica and tungsten oxide. A desirable method of the present invention for treating the gas is, using the above catalyst, that the gas flow containing organohalogen compounds less than 10 vol. % is contacted with the catalyst at a temperature below 500° C. in the presence of steam less than 30 vol. % of total gas flow to decompose the organohalogen compounds to carbon monoxide, carbon dioxide, and hydrogen halides. It was revealed that the catalyst had significantly superior decomposing activity and high durability, when a porous layer made of silica was formed on the surface of the titania particles and a porous layer made of tungsten oxide was formed on the porous layer made of silica, or when a porous layer made of tungsten oxide was formed on surface of the titania particles and a porous layer made of silica was formed on the porous layer made of tungsten oxide. The catalyst contains silica, titanium, and tungsten in a form of an oxides mixture, or a complex oxide. Thickness of the porous layer made of silica or tungsten oxide is desirably in the range of 1 Å~5 mm.

Titania, itself, has a high activity for decomposing organohalogen compounds. However, the activity decreased gradually if fluorine values existed in the treating gas, because the number of active points in the catalyst decreased in accordance with forming a compound, i.e. $TiOF_2$, and eliminating titania from the catalyst. On the other hand, silica itself does not have a high activity for decomposing organohalogen compounds, but has an effect to prevent the decrease of the active points by combining with titania.

Tungsten oxide is scarcely reactive with fluorine, and tungsten oxide has an effect to prevent titania from forming a compound with flon. However, tungsten oxide itself has a small specific surface area and low activity.

The catalyst according to the present invention contains titania, silica, and tungsten oxide and is scarcely deteriorated with HF and HCl, which are decomposition products, thus a high activity for decomposing organohalogen compounds is maintained for a long time.

As a method for forming a porous layer made of silica or tungsten oxide on the surface of particles made of titania, an impregnating method comprising the steps of impregnating a solution containing silica or tungsten into the particles made of titania, and calcining the particles, a method wherein a solution containing silica or tungsten is applied onto particles of titania, or a deposition method can be used.

When the catalyst, wherein the surface of the titania particles are coated with silica and further coated with tungsten oxide, is prepared by the impregnating method, the amount of silica is desirably in the range of from 0.5 to less than 2 parts by weight to 100 parts by weight of titanium, and sizes of the titania particles are desirably in the range of 2~4 mm. The catalyst has a significantly higher activity than the catalyst made of titania-tungsten oxide and a preferable durability as shown later in the embodiment 2.

When the catalyst, wherein the surface of the titania particles are coated with tungsten oxide, and further coated with silica, is prepared by the impregnating method, the amount of silica is desirably in the range of 2~15 parts by weight to 100 parts by weight of titanium, and sizes of the titania particles are desirably in the range of 0.5~1 mm. The Ti and W are present in the amount of desirably 20 mol %~90 mol % Ti and 80 mol %~10 mol % W based on Ti and W. In accordance with preparing the catalyst described above, the catalyst has a significantly higher activity than the catalyst made of titania-tungsten oxide and a preferable durability as shown later in the embodiment 1.

In the step of impregnation, when the organohalogen compound is a molecule having one carbon atom, the Ti and W are present in the amount of is desirably 40 mol %~90 mol % Ti and 60 mol %~10 mol % W based on Ti and W. When the molecule has two carbon atoms, the Ti and W are present in the amount or is desirably 20 mol %~85 mol % Ti and 80 mol %~15 mol % W based on Ti and W, because the number of halogen atoms contained in the molecule is increased, and further, the porous layer coating the surface of the titania particles is desirably thick. The content of silica is desirably in the range of approximately 0.5~15% by weight to 100% by weight titania in either cases.

The titania particles of the present invention are most desirably granular shapes formed by a roll-pelletizing method. In this case, porosity of inside the catalyst can be readily controlled.

The catalyst added with at least one element selected from the group consisting of S, P, Mo, and V was found to further improve the durability of the catalyst. The amount of S, P, Mo, and V is desirably in the range of 0.001–10 mol %.

The catalyst relating to the present invention can be used by forming the catalyst in the shape of particles, pellets, or honeycombs. The shapes can be formed by an arbitrary method such as extrusion, pelletizing method, or roll-pelletizing method. In the above case, alumina cement, calcium-sodium cement, and other ceramics and organic components can be mixed in order to improve strength of the shaped body and to increase the specific surface area of the catalyst. Naturally, the catalyst can be used in a form supported with a granular carrier such as the one made of alumina or silica by a method such as an impregnating method and the like. Furthermore, the catalyst can be used in a form of being coated onto a honeycomb or a plate made of ceramics or a metal.

As raw materials for titanium for preparing the catalyst relating to the present invention, titanium oxide, various titanic acids which generate titanium oxide by heating, titanium sulfate, titanium chloride, organo-titanium compounds, and the like are usable.

A desirable method comprises the steps of precipitating hydroxide of titanium from a solution of the raw material by adding water, ammonium aqueous solution, alkaline solution, and the like, and finally forming oxides by calcination.

As raw materials for silica, silica sol is usable.

As raw material for tungsten, tungsten oxide, tungstic acid, ammonium paratungstate, and the like are desirable. Raw material which contains both phosphorus and tungsten such as ammonium phosphotungstate is usable.

The catalyst of the present invention is less deteriorative as the more acidic the active points in the catalyst are, and containing components, which enhances the acidity of the catalyst, such as S and P, is also effective. The S exists in a form of oxide ion, such as sulfuric acid ion, and the like.

The organohalogen compounds, which are objects of the present invention, are organic compounds which contain at least any one of fluorine, chlorine, and bromine in its molecule such as various chlorofluorocarbons (flon), trichloroethylene, methyl bromide, and the like.

When flon 113 or methyl bromide is taken as an example, the following reactions are generated by contacting with the catalyst:

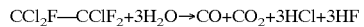

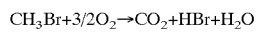

In order to perform the decomposition reaction for an organohalogen compound having two carbon atoms, steam in the gas to be treated is desirably adjusted to exist at least three times in moles of the organohalogen compound. In accordance with performing the decomposition reaction under the atmosphere described above, improvement in decomposition efficiency can be expected. Further, an advantage that the decomposition product can be obtained in a form of hydrogen halide, which can be readily treated in the down-stream treatment, is realized. If the steam is less than three times in moles, the above advantages can not be realized sufficiently.

Concentration of the organohalogen compounds in the gas to be treated is desirably less than 10 vol. %. If the concentration is as high as exceeding 10 vol. %, the activity of the catalyst is apt to be deteriorated even if the catalyst has a porous layer made of tungsten oxide. If the treating concentration becomes high, the amount of generated HF and HCl increases, and accordingly, problems such as corrosion of material of the reaction apparatus are generated. On the contrary, if the treating concentration is too low such as less than 1000 ppm, an energy loss is generated, even if the energy necessary for the decomposition is smaller than that of other treating methods. Naturally, the concentration of the organohalogen compounds in the gas to be treated varies depending on the amount of halogen elements contained in the molecules, a concentration of the organohalogen compounds in the range of 0.1~10 vol. % is desirable when the organohalogen compound containing one carbon atom is treated, and a concentration of the organohalogen compounds in the range of 0.1~6 vol % is desirable when the organohalogen compound containing two carbon atom is treated.

The temperature of the gas flow which is contacted with the catalyst is desirably utmost 500° C. If the catalyst temperature exceeds 500° C., a reaction of the catalyst with F occurs readily, and the performance of the catalyst is apt to be deteriorated. When an organohalogen compound having one carbon atom is treated, the temperature of the gas flow in the range of 250°~450° C. is desirable. When an organohalogen compound having two carbon atoms is treated, the temperature range of 300°~500° C. is desirable, because sometimes the amount of the halogen atoms in the molecule is increased. However, when the organohalogen compounds are treated at a temperature exceeding 500° C., gases of decomposition products such as HF, and HCl at a high temperature flow in the apparatus. Accordingly, reaction tubes and pipes of the organohalogen compound treating apparatus are corroded fast, and cost for maintenance is increased.

A space velocity of the gas to be treated is desirably in the range of 500~100,000/hour. When an organohalogen compound having one carbon atom is treated, a space velocity in the range of 1,000~50,000/hour is desirable, and when an organohalogen compound having two carbon atoms is treated, a space velocity in the range of 500~10,000/hour is desirable.

Types of the reactor usable for the present invention are any one of conventional fixed beds, moving beds, or fluidized beds. However, because of generating corrosive gas such as hydrogen fluoride and hydrogen chloride as the decomposition products gas, it is desirable to compose the reactor so that the decomposition products gas can be contacted with alkaline solution for removing acidic components as soon as passing through the catalyst layer.

The treating apparatus for decomposing organohalogen compounds desirably comprises at least an organohalogen compound supplying apparatus, a steam supplying apparatus, an air supplying apparatus, or a reactor packed with catalyst, a heat source for heating catalyst, the catalyst, and a decomposition generated gas scrubber. When the organohalogen compound to be treated is in a liquid state at room temperature, the compound is gasified before introducing into the catalyst layer.

As methods for heating the catalyst, heating by an electric furnace can be used, and a method of introducing a combustion gas of propane, kerosene, town gas, and the like mixed with the organohalogen compound and steam into the catalyst layer is usable. As materials of the reactor packed with the catalyst, corrosion resistant materials such as Inconal Hastalloy, and the like are desirable.

The decomposition products gas scrubber has desirably a structure having a high efficiency in scrubbing the decomposition generated gas by a spray tank and a preferable resistance against pipe-clogging by crystal deposition, such as bubbling the decomposition generated gas into an alkaline solution, or scrubbing the decomposition generated gas by a packed tower. Furthermore, the whole treating apparatus can be loaded onto a truck and transported to a place such as a recovery site of discarded refrigerators, automobiles, and the like, or a storage site of cylinders filled with the organohalogen compounds and the like for extracting and treating the contained organohalogen compounds. Circulating pumps for the scrubbing liquid in the decomposition generated gas scrubber and an exhaust gas adsorbing tower for adsorbing carbon monoxide and the like in the exhaust gas can be loaded onto the truck concurrently. Furthermore, a power generator, cylinders filled with fuel such as propane, kerosene, town gas, and the like for the heating source can be loaded onto the truck concurrently.

The catalyst of the present invention has a high activity for a long time. Therefore, the treating method for decomposing organohalogen compounds relating to the present invention requires substantially no catalyst exchange operation and the like.

Impregnation method is the most desirable for preparing the present catalyst. In accordance with the impregnation method, a porous layer made of silica, tungsten oxide, and the like can be formed on the surface of porous titania particles, and concurrently, silica and tungsten oxide can be dispersed uniformly inside the titania particles. Therefore, even if the silica or tungsten oxide layer at the surface of the titania particles is fallen off, the reactivity of the titania particles with fluorine is scarcely affected and the high activity and the long durability of the catalyst can be maintained.

Furthermore, if Mo or V is added to the catalyst containing titania, silica, and tungsten oxide, the durability of the catalyst can be improved because molybdenum oxide or vanadium oxide covers the surface of the titania which may be exposed by the falling off of tungsten oxide.

Acidity of the reactive points is increased if $SO_4$ ions exist in the catalyst, and the catalyst becomes less deteriorative by HF and HCl in the decomposition products.

DETAILED DESCRIPTION OF THE EMBODIMENTS

Figure 3:
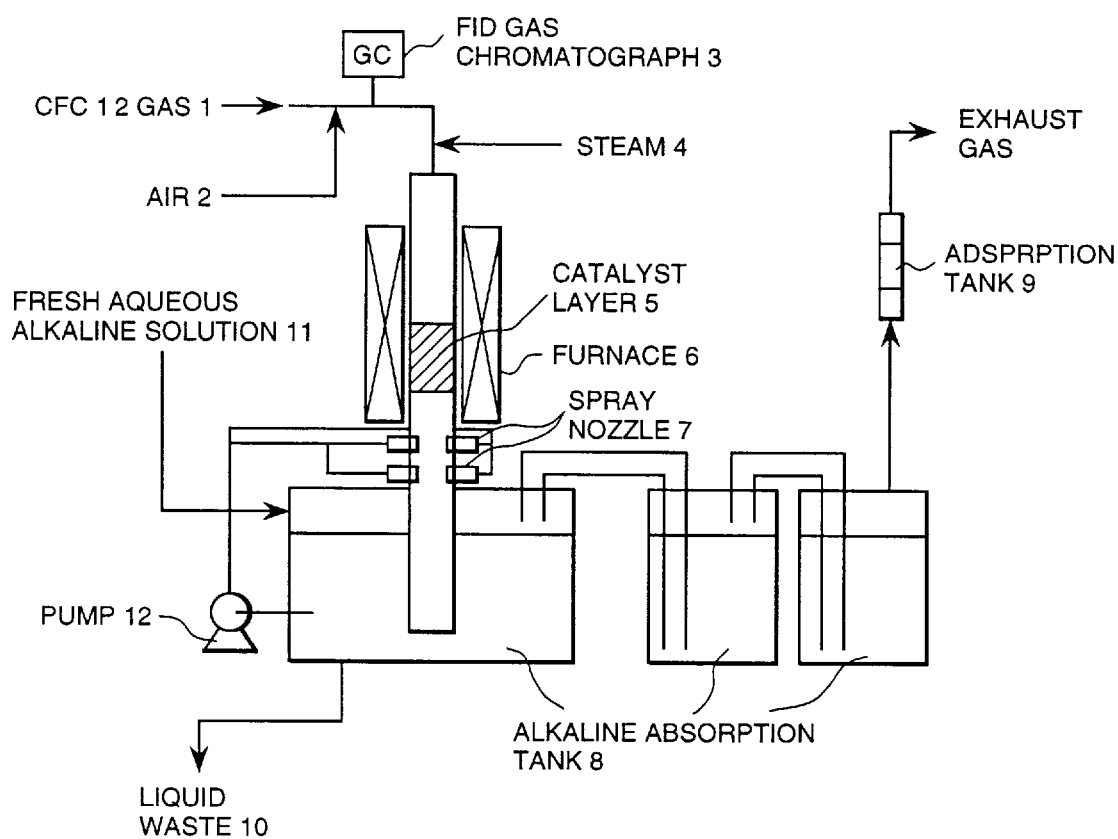
FIG. 3 is a schematic drawing indicating an embodiment of the composition of the organohalogen compound decomposition apparatus.
Figure 4:
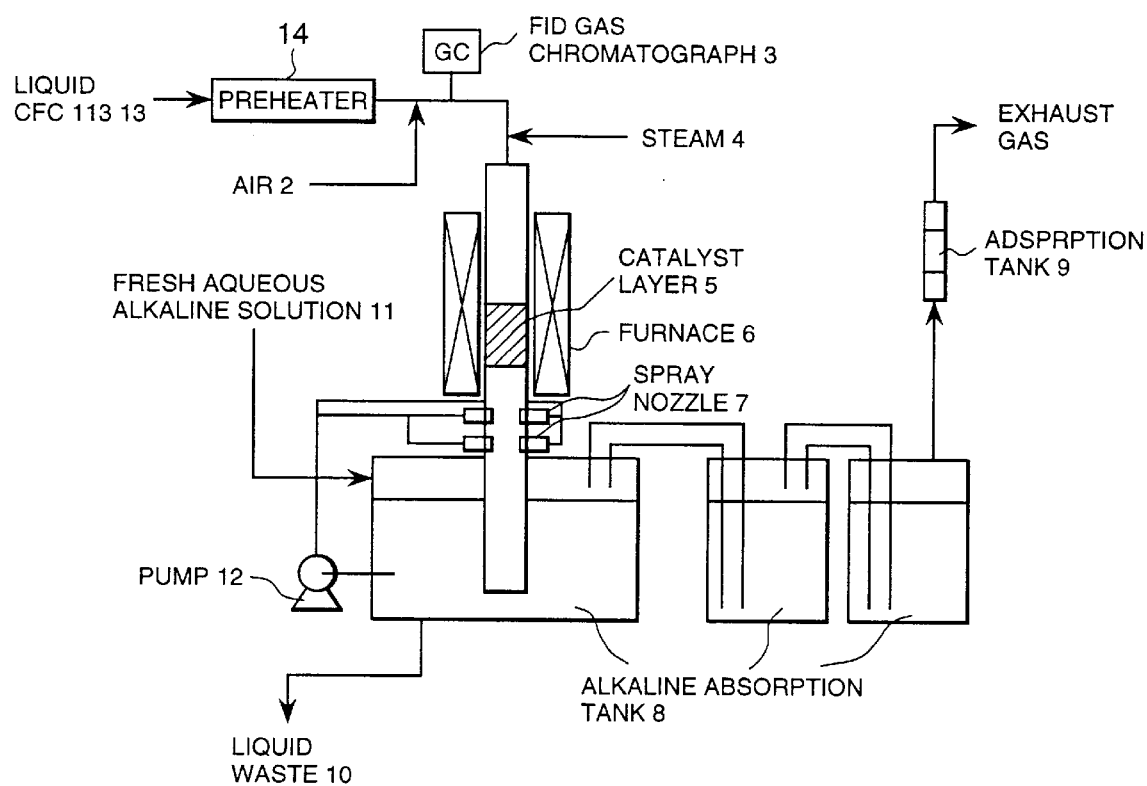
FIG. 4 is a schematic drawing indicating another embodiment of the composition of the organohalogen compound decomposition apparatus.

FIGS. 3 and 4 indicate examples of the apparatus to be used in the method for decomposing organohalogen compound relating to the present invention. FIG. 3 indicates an example when the organohalogen compound is gaseous at room temperature, and FIG. 4 indicates an example when the organohalogen compound is liquid at room temperature.

The apparatus shown in FIG. 3 is explained hereinafter.

Concentration of CFC12 gas 1 to be treated is analyzed by an analyzer 3 such as a FID gas chromatography and the like, and the CFC12 is diluted with air 2 to be approximately 3% of flon concentration. After adding approximately five times the amount of steam-to-flon moles to the diluted flon gas, the gas is introduced into a catalyst bed 5 packed with the catalyst for decomposing flon. The space velocity is approximately 3,000/hours (Space velocity=gas flow rate (ml/h)/amount of the catalyst (ml)). The catalyst bed 5 was externally heated by an electric furnace 6 to make the catalyst temperature at approximately 440° C. The catalyst temperature can be elevated by another method, wherein a high temperature gas obtained by combustion of propane gas and the like is introduced into the catalyst bed. The decomposition generated gas is bubbled into an alkaline absorption tank 8 contacting with an aqueous solution of sodium hydroxide which is sprayed from spray nozzles 7. The gas passed through the alkaline absorption tank 8 is introduced into an adsorption tank 9 packed with active carbon and the like, and released to air as exhaust gas is after passing through the adsorption tank 9. The liquid sprayed from the spray nozzles 7 can be simply water, or a slurry of calcium carbonate and the like. The used alkaline aqueous solution 10, which is regarded as liquid waste, in the alkaline absorption tank 8 is regularly taken out, and exchanged with fresh alkaline aqueous solution 11. The alkaline solution in the alkaline absorption tank 8 is circulated by a pump 12 and used as the alkaline solution sprayed from the spray nozzles 7.

Next, FIG. 4 is explained hereinafter.

The apparatus shown in FIG. 4 is as same as the apparatus shown in FIG. 3 except a preheater 14 is additionally provided.

When the organohalogen compound to be treated is in a liquid phase at room temperature as CFC113 liquid 13, the compound is vaporized by the preheater 14. Subsequently, concentration of the compound is determined by an analyzer 3 such as the FID gas chromatography and the like, and is diluted with air 2 to be approximately 3% of flon concentration. The diluted gas is treated the same as in the case of FIG. 3.

(Embodiment 1)

The present embodiment is a result of studying the activity of the catalyst made of titania, of which surface is coated with a porous tungsten oxide layer, and further coated with a porous silica layer.

Titanium oxide particles having a diameter of 2~3 mm (made by Sakai Chemicals Co. CS-224S) were pulverized and sieved to a range of 0.5~1 mm, and dried at 120° C. for 2 hours.

An aqueous solution of hydrogen peroxide dissolving 82.2 g of ammonium paratungstate was impregnated into 100 g of the dried titanium oxide. After the impregnation, the catalyst A was prepared by drying the impregnated catalyst again at 120° C. for 2 hours, and calcining at 500° C. for 2 hours. The Ti and W were present in the amount of 80 mol % Ti and 20 mol % W based on Ti and W. Next, a sol aqueous solution B was prepared by adding distilled water 50 g to silica sol 25 g containing silica by 20 wt. %. The catalyst A was impregnated with the sol aqueous solution B, and the catalyst C was prepared by drying the impregnated catalyst again at 120° C. in air for 2 hours, and calcining at 500° C. for 2 hours. The catalyst C contained silica 5 wt. % to titania. Next, a sol aqueous solution E was prepared by adding 24 g distilled water to 51 g silica sol. containing 20 wt. % silica. The catalyst A was impregnated with the sol aqueous solution E, and the catalyst D was prepared by drying the impregnated catalyst again at 120° C. in air for 2 hours, and calcining at 500° C. for 2 hours. The catalyst D contained 10 wt. % silica to 100 wt. % titania. A relationship between the decomposition activity for CFC 12 and the silica concentration to titania was determined by preparing the catalysts containing 1, 3, 7, and 50 wt. % of silica to titania.

The composition of an experimental apparatus used in the experiment was shown in FIG. 3. A reactor tube made of inconel had an inner diameter of 16 mm, and a catalyst bed was arranged in the middle of the reactor tube. A thermocouple sheath made of inconel of 3 mm outer diameter was inserted into the reactor tube. The reactor tube was heated by an electric furnace, and the catalyst temperature was determined by the thermocouple. The amount of steam was regulated by supplying and evaporating a designated amount of purified water with a pump at the upper portion of the reactor tube. CFC12 was used as the organohalogen compound. The supplied gas had the following composition:

| CFC12 | 5% |
|---|---|
| Steam | 25% |
| Oxygen | 10~20% |
| Nitrogen | Balance |

The gas having the above composition was supplied into the catalyst bed at a temperature in the range of 400°~440° C. with a space velocity of 20,000/hour. The generated decomposition gas through the catalyst bed was bubbled into an alkaline aqueous solution, and concentration of CFC12 in the gas passed through the alkaline aqueous solution was analyzed by a FID gas chromatography. A decomposition fraction of the organohalogen compound was obtained by the following equation.

Decomposition fraction=1-(organohalogen compound at the outlet/ supplied organohalogen compound)×100%  (1)

Figure 1:
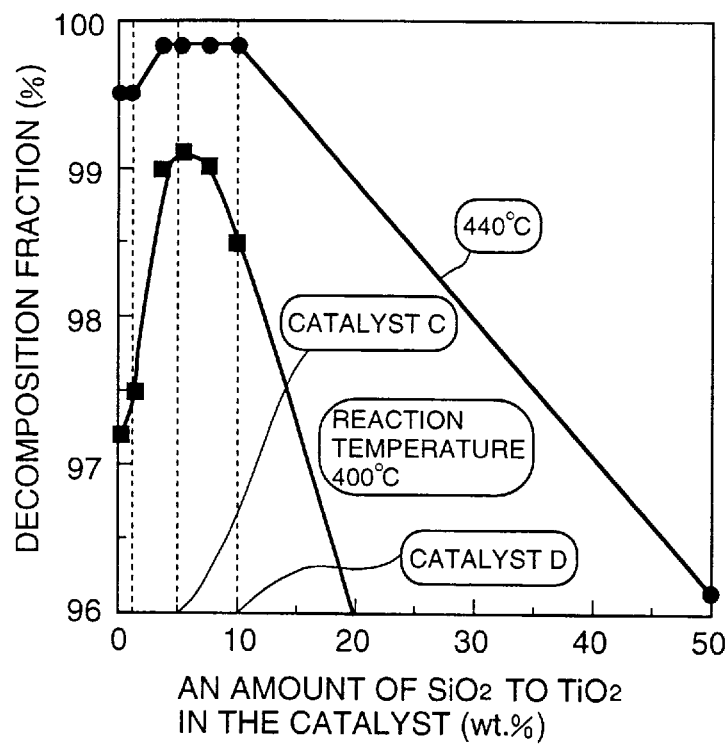
FIG. 1 is a graph indicating CFC12 decomposition fraction of the catalyst made of titania-tungsten oxide-silica in an embodiment of the present invention, and of the catalyst made of titania-tungsten oxide in a comparative example.

A relationship between the decomposition fraction of CFC12 at 5 hours after starting the reaction and the concentration of silica to titania is shown in FIG. 1. The value at 0% silica content in FIG. 1 indicates the performance of the catalyst A itself.

Figure 2:
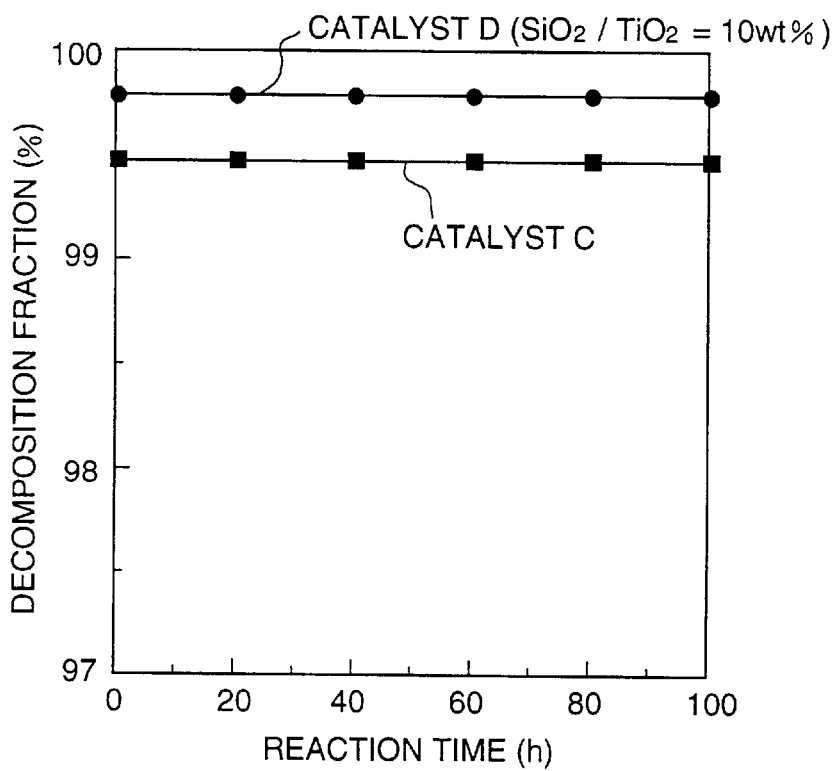
FIG. 2 is a graph indicating a relationship between the CFC12 decomposition fraction and reaction time of two kinds of titania-tungsten oxide-silica catalysts having a different content of silica from each other.

FIG. 2 indicates a result of continuous decomposition experiments for 100 hours on the catalysts C and D of the present invention at 440° C. of the catalyst temperature. The conditions of the experiment were as same as the previous experiment.

(Embodiment 2)

The present embodiment is a result obtained by investigation on the activity of the catalyst, wherein surface of titania was coated with a porous layer made of silica, and the porous layer made of silica is further coated with a porous layer made of tungsten oxide.

Titanium oxide particles having a diameter of 2~4 mm (made by Sakai Chemicals Co. CS-224S) were dried at 120° C. for 2 hours. A sol aqueous solution was prepared by adding 22.5 g distilled water to 15 g silica sol. containing 20 wt. % silica. The above 100 g catalyst was impregnated with the sol aqueous solution, dried at 120° C. in air for 2 hours, and calcined at 500° C. for 2 hours. The catalyst was analyzed by fluoric acid weight analysis to contain 15 wt. % silica and by ICP emission spectral analysis to contain 98.5 wt. % titania. Next, The catalyst was impregnated with a solution, which was prepared by dissolving 41.25 g ammonium paratungstate into 37.5 g hydrogen perioxide aqueous solution. After the impregnation, the impregnated catalyst was dried at 120° C. for 2 hours. The catalyst was again impregnated with the solution containing ammonium paratungstate, dried at 120° C. for 2 hours, and calcining at 500° C. for 2 hours. The catalyst F was prepared by the procedure described above. The amount of tungsten oxide in the catalyst F was determined by ICP emission spectral analysis for obtaining the atomic ratio of Ti:W. The atomic ratio of Ti:W was 80:20 mol %.

Additionally, the catalyst G (the atomic ratio of Ti:W was 80:20), which was prepared as same as the catalyst F except no silica was added, the catalyst H (the atomic ratio of Ti:W was 80:20, the amount of silica to titania was 1 wt. %), which was prepared as same as the catalyst F except using a silica sol aqueous solution which was prepared by adding 32.5 g distilled water to 5 g silica sol. containing 20 wt. % silica, and the catalyst I (the atomic ratio of Ti:W was 80:20, the amount of silica to titania was 2.5 wt. % Si to 100 wt. % Ti), which was prepared as same as the catalyst F except using a silica sol aqueous solution which was prepared by adding 12.5 g distilled water to 25 g silica sol. containing 20 wt. % silica.

The composition of the experimental apparatus used in the experiment was shown in FIG. 3. A reactor tube made of inconel had an inner diameter of 31 mm, and a catalyst bed was arranged at middle of the reactor tube. A thermocouple sheath made of inconel of 3 mm outer diameter was inserted into the reactor tube. The reactor tube was heated by an electric furnace, and the catalyst temperature was determined by the thermocouple. The amount of steam was regulated by supplying and evaporating a designated amount of purified water with a pump at the upper portion of the reactor tube. CFC12 was used as the organohalogen compound. The supplied gas had the following composition:

| | |
|---|---|
| CFC12 | 3% |
| Steam | 15% |
| Oxygen | 10~20% |
| Nitrogen | Balance |

The gas having the above composition was supplied into the catalyst bed at 460° C. with a space velocity of 2,300/hour. The generated decomposition gas through the catalyst bed was bubbled into an alkaline aqueous solution, and concentration of CFC12 in the gas passed through the alkaline aqueous solution was analyzed by a FID gas chromatography. The decomposition fraction of the organohalogen compound was obtained by the equation (1).

Figure 5:
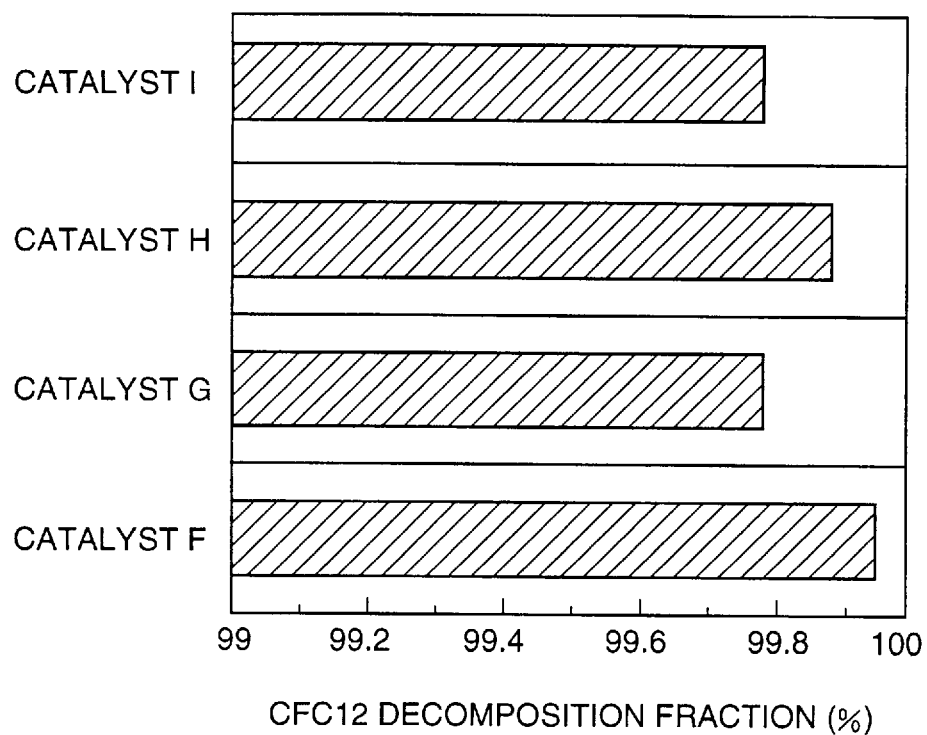
FIG. 5 is a graph indicating CFC12 decomposition fractions of the catalyst made of titania-tungsten oxide-silica in other embodiments of the present invention and of the catalyst made of titania-tungsten oxide in the comparative example.
Figure 6:
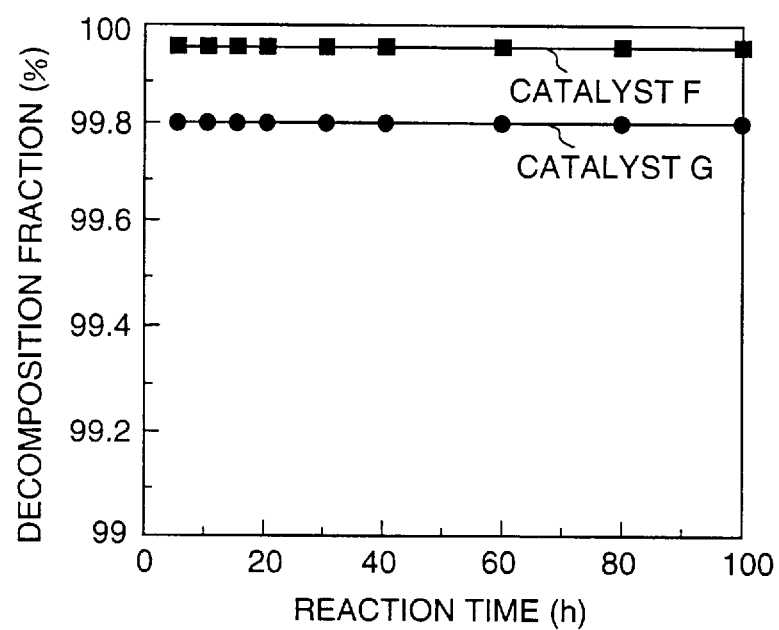
FIG. 6 is a graph indicating a relationship between CFC12 decomposition fraction and reaction time on the catalyst made of titania-tungsten oxide-silica in the embodiment of the present invention, and on the catalyst made of titania-tungsten oxide in the comparative example.

The decomposition fractions of the respective catalysts are shown in FIG. 5. Relationships between the reaction time and the decomposition fraction of CFC12 by the catalysts F and G are shown in FIG. 6.

According to FIG. 5, it is clearly revealed that the decomposition fractions of the catalyst F and H are higher than other catalysts I and G, and the catalysts F and H have an activity superior to catalysts I and G.

In accordance with the results shown in FIGS. 1 and 5, it is clearly revealed that the effect of silica is influenced by the size of the titania particles. That is, when the amount of silica to titania exceeds 2 wt. %, a preferable particle size of titania is in the range of 0.5~1 mm, and when the amount of silica to titania is less than 2 wt. %, a preferable particle size of titania is in the range of 2~4 mm.

Figure 7:
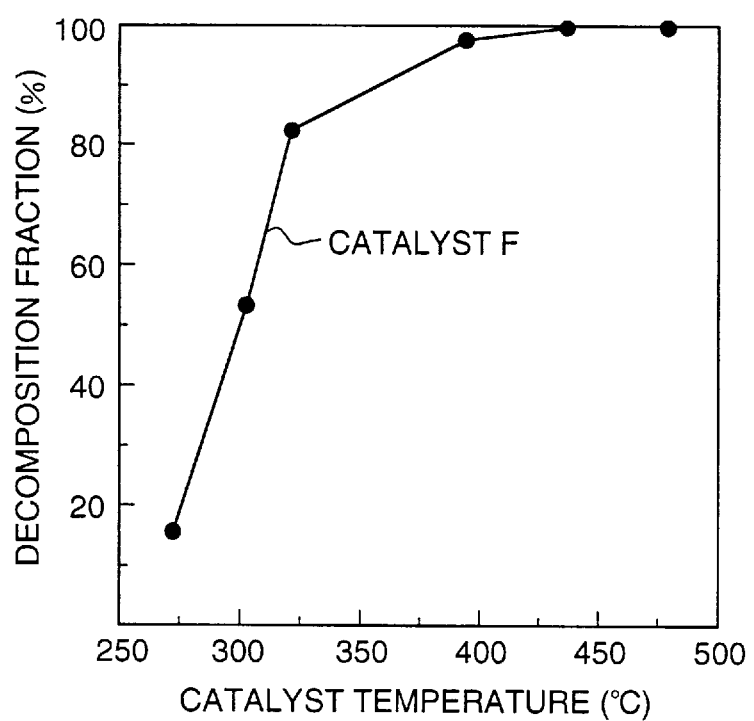
FIG. 7 is a graph indicating a relationship between HCFC22 decomposition fraction and reaction time on the catalyst made of titania-tungsten oxide-silica in the embodiment of the present invention.

The activity of the catalyst F, when HCFC22 is used as the organohalogen compound, is shown in FIG. 7. The examination condition was as same as the case of CFC12.

In accordance with the decomposition method of the present invention, organohalogen compounds such as chlorofluorocarbon group (CFC group) can be decomposed effectively. The catalyst of the present invention has advantages such as a high decomposition efficiency and a superior durability.

What is claimed is:

1. A method for treating gas containing organohalogen compounds, comprising the step of:

making a catalyst, containing titania and tungsten oxide, and contacting said catalyst with the gas containing an organohalogen compound at a temperature lower than 500° C. in the presence of steam to decompose the organohalogen compound into carbon monoxide, carbon dioxide, and hydrogen halides, wherein said catalyst contains titania, silica, and tungsten oxide, and the surface of titania in said catalyst is coated with porous layers made of silica and tungsten oxide, content of silica in said catalyst is approximately 0.5–15 parts by weight to 100 parts by weight titania, and the Ti and W are present in the amount of 20 mol %–95 mol % Ti and 80 mol %–5 mol % W based on Ti and W.

2. A method for treating gas containing an organohalogen compound as claims in claim 1, wherein the surface of titania in said catalyst is coated with a porous layer made of silica, and surface of said porous layer made of silica is coated with a porous layer made of tungsten oxide.

3. A method for treating gas containing an organohalogen compound as claimed in claim 1, wherein the surface of titania in said catalyst is coated with a porous layer made of tungsten oxide, and surface of said porous layer made of tungsten oxide is coated with a porous layer made of silica.

4. A method for treating gas containing an organohalogen compound is claimed in claim 2, wherein said catalyst is prepared by a method comprising the steps of:

impregnating a solution containing silicon into said catalyst from the surface of titania particles, calcining the impregnating catalyst, subsequently impregnating a solution containing tungsten into said catalyst, and calcining the impregnated catalyst.

5. A method for treating gas containing an organohalogen compound as claimed in claim 3, wherein said catalyst is prepared by a method comprising the steps of:

impregnating a solution containing tungsten into said catalyst from the surface of titania particles, calcining the impregnated catalyst, subsequently impregnating a solution containing silicon into said catalyst, and calcining the impregnated catalyst.

6. A method for treating gas containing an organohalogen compound as claimed in claim 2, wherein the content of silica in said catalyst is approximately 0.5 to less than 2 parts by weight to 100 parts by weight titania.

7. A method for treating gas containing an organohalogen compound as claimed in claim 3, wherein the content of silica in said catalyst is approximately 2–15 parts by weight to 100 parts by weight titania.

8. A method for treating gas containing an organohalogen compound as claimed in claim 1, wherein the content of silica in said catalyst is approximately 0.5 to less than 2 parts by weight to 100 parts by weight titania, and a particle diameter of said titania particle is in the range of 2–4 mm.

9. A method for treating gas containing an organohalogen compound as claimed in claim 1, wherein the content of silica in said catalyst is approximately 2–15 parts by weight to 100 parts by weight titania, and a particle of said titania particle is in the range of 0.5–1 mm.

10. A method for treating gas containing an organohalogen compound as claimed in claim 1, wherein said catalyst contains at least one element selected from the group consisting of S, P, Mo, and V, and a content of respective of the elements is in the range of 0.001–10 mol % based on Ti.

* * * * *